(12) United States Patent
Arsenault et al.

(10) Patent No.: US 10,212,233 B2
(45) Date of Patent: Feb. 19, 2019

(54) DATA TRANSFER IN A SYSTEM OF CONNECTED THINGS

(71) Applicants: TELEFONAKTIEBOLAGET L M ERICSSON (PUBL), Stockholm (SE); Marc-Olivier Arsenault, Montreal (CA); Mario Bonja, Mirabel (CA); Emmanuel Grecki, Montreal (CA); Steven Rochefort, Pointe-Claire (CA)

(72) Inventors: Marc-Olivier Arsenault, St-Constant (CA); Mario Bonja, Mirabel (CA); Emmanuel Grecki, Montreal (CA); Steven Rochefort Rochefort, Pointe Claire (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 181 days.

(21) Appl. No.: 15/502,369

(22) PCT Filed: Aug. 7, 2014

(86) PCT No.: PCT/IB2014/063785
§ 371 (c)(1),
(2) Date: Feb. 7, 2017

(87) PCT Pub. No.: WO2016/020726
PCT Pub. Date: Feb. 11, 2016

(65) Prior Publication Data
US 2017/0237815 A1 Aug. 17, 2017

(51) Int. Cl.
*G06F 15/16* (2006.01)
*H04L 29/08* (2006.01)
*H04W 4/70* (2018.01)
*H04L 12/46* (2006.01)

(52) U.S. Cl.
CPC .......... *H04L 67/12* (2013.01); *H04L 12/4633* (2013.01); *H04L 12/4641* (2013.01); *H04W 4/70* (2018.02)

(58) Field of Classification Search
CPC ...................................................... H04L 67/12
USPC ........................................................ 709/217
See application file for complete search history.

(56) References Cited

U.S. PATENT DOCUMENTS

| | | | |
|---|---|---|---|
| 9,949,130 B2* | 4/2018 | Ophir | H04W 4/70 |
| 2009/0012636 A1* | 1/2009 | Kung | G11B 27/034 |
| | | | 700/94 |
| 2012/0063363 A1* | 3/2012 | Li | H04L 12/4645 |
| | | | 370/255 |
| 2012/0124201 A1 | 5/2012 | Muhanna et al. | |
| 2013/0246519 A1 | 9/2013 | Foti | |
| 2014/0359035 A1* | 12/2014 | Wang | H04L 51/06 |
| | | | 709/206 |
| 2015/0085665 A1* | 3/2015 | Kompella | H04L 47/2483 |
| | | | 370/236 |

(Continued)

Primary Examiner — Hamza N Algibhah
(74) Attorney, Agent, or Firm — Ericsson Canada Inc.

(57) ABSTRACT

The invention relates to a method, a system and apparatuses for establishing application virtual data paths (VDP) over a device gateway, a network of interconnect end-points and an application server gateway for the purpose of forwarding application data from an Internet of Things (IoT) device to its destination application server based on the unique IoT device identity, while the IoT device, the device gateway and the network of end-points are unaware of the destination application server.

30 Claims, 13 Drawing Sheets

(56) References Cited

U.S. PATENT DOCUMENTS

| | | | |
|---|---|---|---|
| 2015/0381737 A1* | 12/2015 | Quinn | H04L 67/12 709/217 |
| 2016/0080207 A1* | 3/2016 | Prakash | H04L 69/16 370/231 |
| 2016/0085594 A1* | 3/2016 | Wang | H04L 67/18 709/226 |
| 2016/0088049 A1* | 3/2016 | Seed | H04W 4/70 709/203 |
| 2016/0112487 A1* | 4/2016 | Wang | G06F 9/54 709/201 |

* cited by examiner

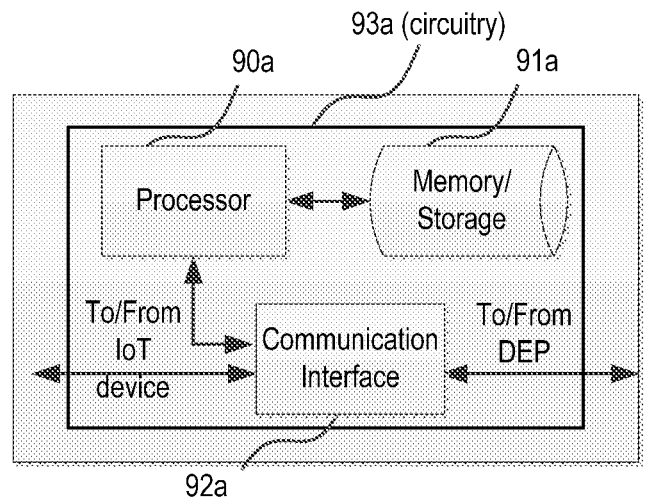
Figure 9A (Device Gateway)
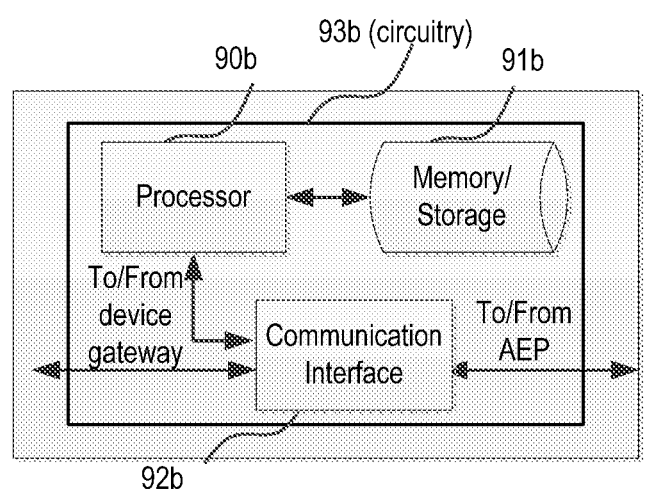
Figure 9B (DEP)

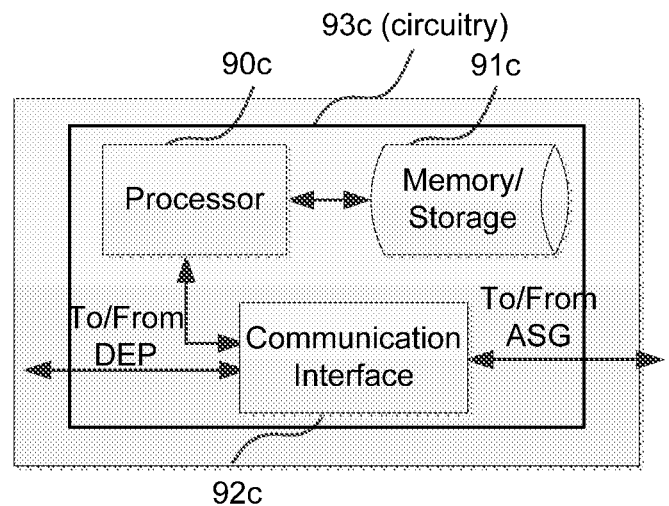
Figure 9C (AEP)
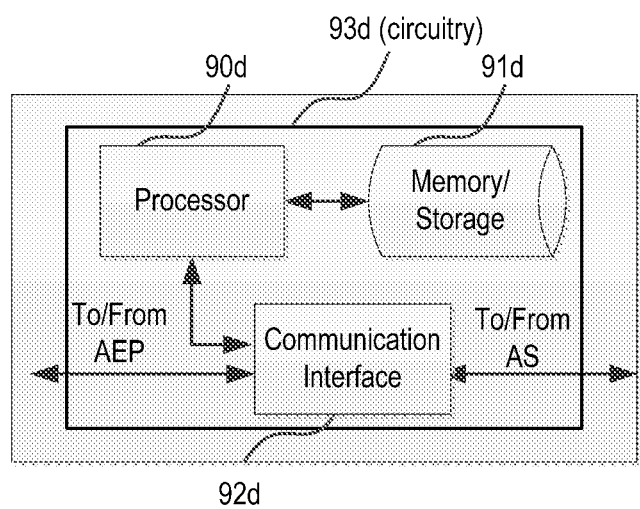
Figure 9D (ASG)

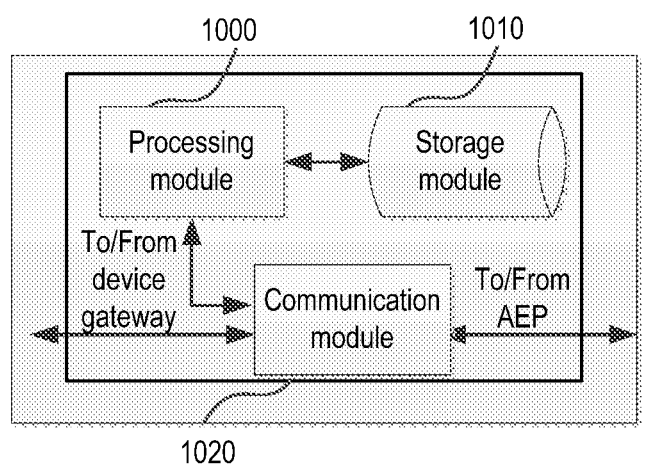
Figure 10 (DEP)

DATA TRANSFER IN A SYSTEM OF CONNECTED THINGS

TECHNICAL FIELD

This disclosure relates generally to communication between connected things and application servers in a communication network.

BACKGROUND

There is an increasing trend in integrating the internet with the physical world to create the Internet of Things (IoT), also referred to as Cloud of Things, Internet of Objects, Machine-to-Machine (M2M) communications, with a prediction that up to 50 billion devices would be connected to the internet by 2020. Connecting remote devices, machines, assets and other entities to create value-based systems, to optimize a variety of goods-delivery mechanisms and to improve people's lives represent the primary value proposition for the IoT. The term IoT is used henceforth in this disclosure to include not only the internet of things or objects, but also M2M communications.

Driving this trend is the emergence of various wireless technologies comprising low-cost wireless technologies such as Wi-Fi, ZIGBEE™, Z-WAVE™, etc. and other cellular technology such as 3G and Long Term Evolution (LTE), coupled with a growing proliferation of connected things or machines such as connected consumer electronics, intelligent devices with integrated sensors, devices with actuation capabilities, smartphones, intelligent appliances, etc. This is further enabled by a plethora of applications in the sectors comprising energy, computing, transportation, security, home automation, smart cities, etc.

With the proliferation of connected things also referred to in this disclosure as IoT devices, a number of challenges have arisen in the lack of efficient communication between the connected things and the corresponding destination servers. For instance, some existing IoT solutions known as M2M usually rely on point-to-point communications using embedded hardware modules and either wireless/cellular (e.g., 3G, LTE, Wi-Fi, etc.) or wired networks, and typically use communication services such as short message service (SMS), or virtual private networks (VPN) over the internet with point-to-point tunneling to transfer the data between the connected things and the corresponding destination servers. Other IoT solutions typically rely on IP-based networks to interface devices to a cloud or middleware platform.

It is also very common that communication and data transmission from connected things to specific application servers is performed through a gateway. The gateway may be any device such as a residential gateway, a smartphone, a computer, etc. that has the ability to establish communication with one or more connected things and relay that communication to the corresponding destination servers.

To communicate data from the connected things through the gateways to corresponding destination servers owning the connected things, the gateways must typically open a connection channel to each destination server to send data and close or maintain the communication channel, reopen another communication channel for another destination server, then close or maintain the communication channel when data transmission is ended, etc. Each channel typically requires a procedure for channel establishment. This raises other challenges as the destination servers require handling of a great number of simultaneous communication channels that may stay open for a long period of time even when no data is being transmitted over them.

Furthermore, current IoT solutions encompassing M2M solutions rely on the connected things and the gateways to know the destination server's identification such as destination Internet Protocol (IP) address and/or port number or Uniform Resource Locator (URL), or Media Access control (MAC) address, etc., for routing the data. This raises yet other challenges as to keeping up with changing ownership of the connected things resulting in changing the destination server identification.

Examples of IoT systems are REST based architecture integrating an IP based or a non-IP based wireless sensor networks (WSNs) with the internet. For such systems, IETF has developed a number of protocols for accessing application services for energy constrained devices such as sensor devices. Protocols like the constrained application protocol (CoAP) [RFC7252] made it possible to provide resource constrained devices with RESTful web service functionalities and consequently to integrate WSNs with the internet. Such solutions however, require knowledge of the destination address before data is allowed to be transmitted.

Another standard solution is described by the oneM2M partnership project, where the oneM2M architecture is based on the concept of a common M2M Service Layer to ensure global functionality of M2M. Similar to the REST based architecture, the devices or the things can gain access to public or private networks through a gateway device where point to point communication with each destination server could be used to send data from the device to the corresponding destination server; therefore, knowledge of the destination server is required at the device or the gateway.

Although it does not describe a solution as the one proposed herein, the document U.S. Pat. No. 8,588,061 B2 bears some relationship with the field of the present patent application. Document U.S. Pat. No. 8,588,061 B2 discloses a method for transferring data over a network using application wire whereby the application wire is created by identifying at an edge node the application flow based on the information in the IP header of the application packet, the IP header comprising the destination identifications such as IP address, port number, etc., and subsequently maps the application flow to one or more pseudowires based on the data rate. The pseudowires refer to the emulation of an Open System Interconnection (OSI) Layer-1 or Layer-2 native service over a network and are maintained throughout the core network. The solution relies on the knowledge of destination addresses and relies on pre-existence of pseudowires.

It would be desirable to provide a scalable system and method that obviate or mitigate the above described challenges. It would also be desirable if quality of service guarantee can be achieved for all the application data carried over the scalable system.

SUMMARY

The following acronyms are used throughout this disclosure.

AEP Application interconnect end-point
AS Destination Application Server
ASG Application server gateway
DEP Device interconnect end-point
EUI Extended Unique Identifier
IoT Internet of things
MAC Media Access Control
MSRP Message Session Relay Protocol NIE Network of interconnect end-points
VDP Virtual data path
SIP Session Initiation Protocol
SDP Session Description Protocol It is an object of the present invention to obviate or mitigate at least one disadvantage of the prior art.

It is another object of some embodiments of the present invention to allow for the transmission of data from IoT devices (e.g., intelligent devices with integrated sensors, devices with actuation capabilities, etc.) towards associated destination application servers where the IoT devices do not know, and/or are not pre-configured with or know, the addresses of the destination application servers. Furthermore, the application data from the IoT devices in a local network is forwarded to the destination application servers without the need to open/close a connection with each of the destination application server. According to these embodiment of the invention, an application Virtual Data Path (VDP) is established for each IoT device to allow for the transfer of the application data towards the proper destination application server.

In a system embodying the principles of the invention, the term IoT is used to encompass all things connecting to a public or a private network for transmitting data, henceforth IoT in this disclosure is also used to encompass M2M communications.

In accordance with the invention, there are provided a system, methods and apparatuses according to the independent claims. Developments are set forth in the dependent claims.

In a system according to one embodiment of the invention, where the system comprises one or more IoT devices, a device gateway, a network of interconnect end-points, an application server gateway and one or more destination application servers, the device gateway is operationally connected to one or more IoT devices and configured to manage requests for one or more application virtual data paths (VDPs) for the one or more IoT devices. The device gateway and the one or more IoT devices are unaware of the destination application servers. The network of interconnect end-points is operationally connected to one or more device gateways and is configured to establish the one or more application VDPs and is also unaware of any destination application servers. The network of interconnect end-points further comprises at least one device interconnect end-point communicating with at least one application interconnect end-point. The application server gateway is operationally connected between the network of interconnect end-points and one or more destination application servers owning the one or more IoT devices, and is configured to terminate the one or more application VDPs.

In one embodiment, the application server gateway can be collocated with the destination application server. In another embodiment the device gateway is also an IoT device.

According to one embodiment of the invention, the device gateway sends a VDP request, for one of the IoT device, requesting establishment of an application VDP to a device interconnect end-point of the network of interconnect end-points; the VDP request comprises a unique IoT device identity. When the device interconnect end-point receives the VDP request comprising the unique IoT device identity it determines an application interconnect end-point in the network of interconnect end-points and forwards the VDP request to the application interconnect end-point. Subsequently, the application interconnect end-point receives the VDP request comprising the unique IoT device identity and determines an application server gateway to which it forwards the VDP request. As the application server gateway receives the VDP request comprising the unique IoT device identity, it determines a destination application server owning the IoT device, and sends a VDP response message to the application interconnect end-point indicating that it accepts establishment of the application VDP. Upon receiving the response message, the application interconnect end-point assigns a VDP identifier for the application VDP, stores a first association comprising the application server gateway and the VDP identifier and sends a VDP response message including the VDP identifier to the device interconnect end-point and to the application server gateway causing the application server gateway to store a second association comprising the unique IoT device identity, the VDP identifier and the destination application server. As the device interconnect end-point receives the VDP response message comprising the VDP identifier, it stores a third association comprising the VDP identifier and the application interconnect end-point and forwards the VDP response message to the device gateway. Upon receiving the VDP response message comprising the VDP identifier, the device gateway stores a fourth association comprising the VDP identifier and the unique IoT device identity.

In another embodiment of the present invention, the VDP request originated from the device gateway comprises the identity of the device gateway requesting the application VDP and in another embodiment described in the invention, the device gateway triggers the VDP request upon receiving a VDP request from an IoT device capable of requesting application VDPs, and in yet a further embodiment, the device gateway triggers the VDP request upon receiving application data from the IoT device, at which point, the device gateway determines that an application VDP should be requested, buffers the data sends the VDP request to request an application VDP on behalf of the IoT device, and when the device gateway receives a VDP identifier for the requested application VDP, it stores the association with the unique IoT device identity and sends the buffered data to the device interconnect end-point over the application VDP pre-appended with a VDP header comprising the VDP identifier.

Particular embodiments may optionally include an external centralized authorization table configured to maintain a mapping between each unique IoT device identity with an application interconnect end-point, the external centralized authorization table receives, from the device interconnect end-point, a message comprising the unique IoT device identity for the IoT device and responds by sending a message comprising an identity of the application interconnect end-point with which the application VDP should be established.

In a further embodiment, the application server gateway receiving the VDP request from the application interconnect end-point, sends a request to the destination application server, the request comprises the unique IoT device identity and the identity of the device gateway, to validate the IoT device and receives a response validating the IoT device, at which point the application server gateway sends the VDP response message back to the application interconnect end-point to indicate acceptance of the application VDP.

In a further embodiment, the unique IoT device identity comprises an access technology type and a corresponding manufacturer device identifier.

When the device gateway receives application data from the IoT device, the device gateway determines the VDP identifier stored for the unique IoT device identifier, adds a VDP header to the application data, the VDP header comprising the VDP identifier associated with the IoT device, and relays the application data with the VDP header over the application VDP to the device interconnect end-point. The device interconnect end-point determines the application interconnect end-point from the third association and forwards the application data over the application VDP to the application interconnect end-point, the application interconnect end-point determines the application server gateway from the first association and forwards the application data over the application VDP to the application server gateway. Upon receiving the application data over the application VDP, the application server gateway determines the destination application server associated to the VDP identifier and the unique IoT device identifier from the second association and forwards the application data to the destination application server owning the IoT device.

In yet, another embodiment of the present invention, when the application server gateway communicating with one or more destination application servers, receives application data over an established application VDP, it sends the application data with an identifier of a source of the application data, the source comprises the unique IoT device identity.

In one embodiment, the device interconnect end-point communicates with the device gateway over a first pre-established communication service, and the application interconnect end-point communicates with an application server gateway over a second pre-established communication service, where communication services consist of services for remote transmission of voice, data, texts, sound and images. The first pre-established communication service and the second pre-established communication service can offer quality of service. A preferred embodiment in this disclosure consists of using as a communication service a Message Session Relay Protocol (MSRP-RFC4975) pipe pre-established using a RendezVous protocol such as Session Initiation Protocol (SIP—RFC 3261) and Session Description Protocol (SDP—RFC4566) that enable establishment of an MSRP pipe with negotiated quality of service characteristics.

Each service provider network may own, or be otherwise associated with one or more of the IoT devices and the destination application servers in each service provider network can validate and keep track of the IoT device operations; however the IoT device ownership or association may change over time and may be transferred to another service provider network. Any changes in IoT device ownership is transparent to the IoT devices, to the device gateway and the network of interconnect end-points and may only require updating the mapping in the local authorization mapping table or external centralized authorization table.

BRIEF DESCRIPTION OF THE DRAWINGS

Embodiments of the present invention will now be described, by way of example only, with reference to the attached Figures, wherein:

FIG. 9A is a schematic illustration of a device gateway, according to an embodiment.

FIG. 9B is a schematic illustration of a device interconnect end-point, according to an embodiment.

FIG. 9C is a schematic illustration of an application interconnect end-point, according to an embodiment.

FIG. 9D is a schematic illustration of an application server gateway, according to an embodiment.

FIG. 10 is a schematic illustration of a device gateway, according to another embodiment.

DETAILED DESCRIPTION

The various features of the invention will now be described with reference to the figures. These various aspects are described hereafter in greater detail in connection with exemplary embodiments and examples to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions or functions to be performed by elements of a computer system or other hardware capable of executing programmed instructions. It will be recognized that the various actions could be performed by specialized circuits, by program instructions being executed by one or more processors, or by a combination of both. Moreover, the invention can additionally be considered to be embodied entirely within any form of computer readable carrier or carrier wave containing an appropriate set of computer instructions that would cause a processor to carry out the techniques described herein.

Figure 1:
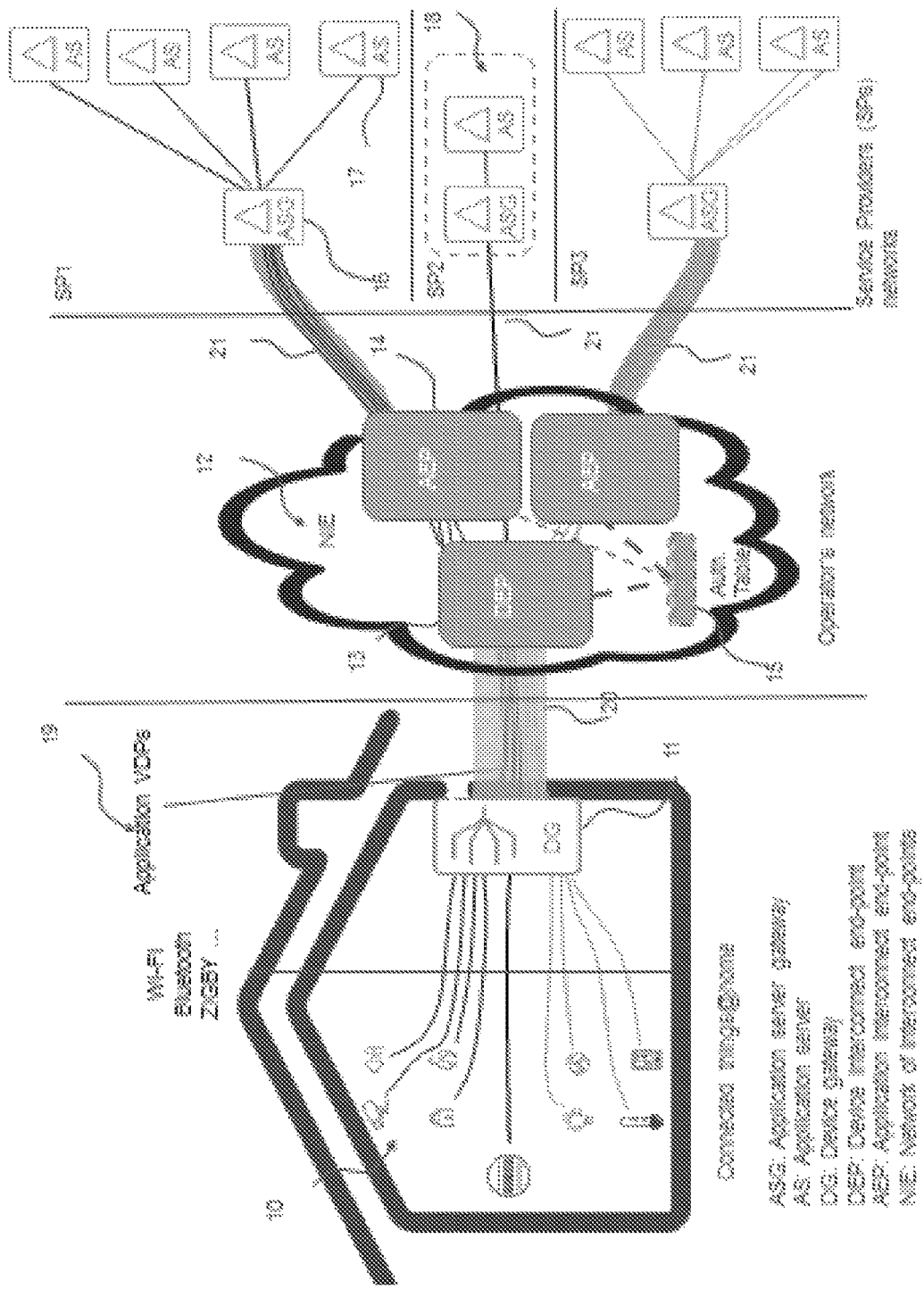
FIG. 1 is a schematic illustration of an overview of a system for connecting things@home, according to an embodiment.

FIG. 1 is a schematic illustration of a system for connecting the IoT devices 10 at home to the destination application servers 17 in the respective service provider networks; more specifically, the system comprises one or more IoT devices 10 connected to a device gateway 11, a network of interconnect end-points 12, one or more application server gateways 16 and one or more destination application servers 17. The system is configured to establish application virtual data paths (VDPs) 19 between the device gateways 11 and the application server gateways 16 to transport the application data from the IoT devices 10, identified by unique IoT device identifiers, to their respective destination application servers 17. Moreover, neither the IoT devices 10 nor the device gateway 11, nor the network of interconnect endpoints 12 are aware of the destination application servers 17 for the application data and the system forwards the application data without having to open a connection with each of the destination application servers 17. The application VDP establishment is essentially based on the unique IoT device identity and once the application VDP 19 is established, the application data is simply transferred over the application VDP towards the destination application server 17.

Although FIG. 1 illustrates an embodiment where the IoT devices 10 are connected in a single home through a device gateway 11, one can envision that a device gateway 11 is used at every connected home, connected factory, connected power plant, water plant, vehicles, etc., namely the IoT devices are connected to a device gateway over one or more different local access technology types, such as ZIGBEE™, Wi-Fi, Bluetooth™, etc and even cellular technologies such as LTE, 3G, etc. The device gateway 11 is connected to a device interconnect end-point 13 in a network of interconnected end-points 12 over a wireless access technology such as 3G, LTE or over a wireline access technology.

The device gateway 11 in FIG. 1 is configured to manage requests for application VDPs 19 for the one or more IoT devices 10. Each VDP request comprises a unique IoT device identity uniquely identifying the IoT device. Once an application VDP 19 is established, it is used to send application data from one IoT device to the device interconnect end-point 13 which will then take care of forwarding the application data upstream towards a destination application server 17. The device gateway 11 and the IoT device 10 are unaware of the destination application server 17.

The network of interconnect end-points 12 in FIG. 1 can be hosted in an operator's network. It is operationally connected to one or more device gateways 11 over first pre-established communication services 20 and over second pre-established communication services 21 to one or more application server gateways 16. The network of interconnect end-points 12 further comprises one or more device interconnect end-points 13 interconnecting or communicating with one or more application interconnect end-points 14. The communication path between a device interconnect end-point 13 and an application interconnect end-point 14, when not co-located, could be a raw communication path where data is transmitted with no additional overhead, an IP communication path or a layer 2 communication path (e.g., Ethernet). Other lightweight communication interfaces could also be used.

The network of interconnect end-points 12 in FIG. 1 is responsible for establishing for an IoT device, an application VDP 19 between a device gateway 11 and an application server gateway 16, using essentially the unique IoT device identity. The device interconnect end-point 13 and the application interconnect end-point 14 mapped to the unique IoT device identity, are responsible for establishing the requested application VDP. The device interconnect end-point 13 communicates with the device gateway over the first pre-established communication service 20 and the application interconnect end-point 14 mapped to the unique IoT device identity, communicates with the application server gateway 16 or 18 over the second pre-established communication service 21. An application interconnect end-point 14 can communicate with one or more application server gateways 16, 18 located in different service provider networks. The service provider networks are the actual owners of the IoT devices 10. When an application interconnect end-point 14 communicates with more than one application server gateway, a mapping table is used to find the application server gateway of the service provider network owning the IoT device. The mapping table stores an association between the unique IoT device identity and the application server gateway of the service provider owning the IoT device.

The device interconnect end-point 13 communicates with the device gateway 11 over a first pre-established communication service 20, and the application interconnect end-point communicates with an application server gateway over a second pre-established communication service 21, where communication services consist of services for remote transmission of voice, data, texts, sound and images. The first pre-established communication service 20 and the second pre-established communication service 21 can offer quality of service for the transmitted data. This disclosure assumes that the first communication service 20, and the second communication service 21 have to be established prior to establishment of the application VDPs 19 because the establishment of the application VDPs 19 are carried over the communication services 20, 21, hence the use of the term "pre-established" communication service.

A preferred embodiment in this disclosure consists of using as a communication service a Message Session Relay Protocol (MSRP—RFC4975) pipe pre-established using a RendezVous protocol such as Session Initiation Protocol (SIP—RFC 3261) and Session Description Protocol (SDP—RFC4566) which enable establishment of an MSRP pipe with negotiated quality of service characteristics. One skilled in the art could for example envision the network operator's domain also hosting a system such as IP multimedia subsystems (IMS) (3GPP™ technical specification 23.228) or any SIP based system architecture to manage the network of interconnect end-points 12. Moreover, the device gateway 11 would host a SIP client and uses SIP and SDP signaling with a SIP server in the network operator's domain to pre-establish the first MSRP pipe 20 with the device interconnect end-point 13. Similarly, a SIP client hosted in an application server gateway 16 or in an application interconnect end-point 14 can negotiate pre-establishment of the second MSRP pipe 21. In fact, one skilled in the art could use any mechanism to pre-establish the first and the second MSRP pipes 20, 21. Although it is understood that any pre-established communication service offering quality of service could be used, pre-established MSRP pipes 20, 21 are used hereafter in this disclosure.

FIG. 1 shows that if the application interconnect end-point 14 is connected to multiple application server gateway 16, a second MSRP pipe 21 is pre-established with each of the application server gateway 16.

All communications between the device gateway 11 and the device interconnect end-point 13 is carried over the pre-established MSRP pipe 20 and all communications between the application interconnect end-point 14 and the application server gateways 16 are carried over the pre-established MSRPs pipe 21. The device gateway 11 in FIG. 1 multiplexes the VDP requests and the corresponding application VDPs 19 for the corresponding IoT devices 10 into the first pre-established MSRP pipe 20 and the application interconnect end-point 14 multiplexes the VDP requests and the corresponding application VDPs 19 associated to the same application server gateway 16 over the second pre-established MSRP pipe 21.

The device interconnect end-point 13 in the network of interconnect end-points 12 receives over the first pre-established MSRP pipe 20 a VDP request and the application data encapsulated in the application VDP 19. It removes the MSRP header before it forwards the VDP request and the application data encapsulated in the application VDP to the application interconnect end-point 14. The application interconnect end-point 14 adds an MSRP header before it forwards over the second pre-established MSRP pipe 21, the VDP request and the application data encapsulated in the application VDP to the application server gateway 16, which forwards the application data to the destination application server.

In an alternative embodiment, the device interconnect end-points 13 and the application interconnect end-points 14 are co-located and the network of interconnected end-points 12 collapses into a single server interconnect in the operator's network. The device interconnect end-point 13 and the application interconnect end-point 14 collapse into a function within that single server interconnect. Upon receiving a VDP request from the device gateway, the single server interconnect determines the next external entity to which it should forward the VDP request, and in this scenario the mapping in the local authorization mapping table or external centralized authorization mapping table returns the identity of the application server gateway 16 of the service provider network owning the IoT device 10. One skilled in the art understands that in the single server interconnect scenario, the VDP identifier is allocated by the single server interconnect and it is not necessary to perform two mapping table look-ups for determining the application interconnect end-point and the application server gateway. One mapping table lookup is performed would result in determining the application server gateway. Furthermore the single server interconnect needs only to store an association between the VDP identifier and the application server gateway. The VDP encapsulated data received from the device gateway is forwarded to the application server gateway from the association. The first and second pre-established MSRP pipes 20, 21 may also be pre-established with the single server interconnect.

In order to create an application VDP 19 for an IoT device 10 between a device gateway 11 and an application server gateway 16, the device interconnect end-point 13 maintains a local authorization mapping table in its storage area that maintains a mapping comprising a unique IoT device identity and an application interconnect end-point 14 that is connected to the application server gateway 16 in the service provider network owning the IoT device. Primary and secondary application interconnect end-points 14 may be configured in the local authorization mapping table. The secondary application interconnect end-point is used when the primary interconnect end-point is unavailable. Similarly, the application interconnect end-point 14 maintains a local authorization mapping table comprising a mapping between a unique IoT device identity and the application server gateway 16 in the service provider network owning the IoT device. In an alternative embodiment, the application interconnect end-point 14 can interface to only one application server gateway 16, in which case, the determination of the application server gateway 16 is obviously straightforward and does not necessarily require maintaining a local authorization mapping table.

In another aspect, an external centralized authorization table 15 is used to store the above mappings. The device interconnect end-point 13 queries the identity of the application interconnect end-point 14 from the external centralized authorization table 15. Similarly, the application interconnect end-point 14 queries the identity of the application server gateway 16, 18 from the external centralized authorization table 15. The query comprises the unique IoT device identity, and may comprise the device gateway information and query originator information (i.e., device or application interconnect end-point information). If a request is received from the device interconnect end-point 13, the external centralized authorization table 15 returns the identity of the application interconnect end-point 14. If the request is received from the application interconnect end-point 14, the external centralized authorization table 15 returns the identity of the application server gateway 16, 18.

FIG. 1 further illustrates an embodiment where one service provider network comprises one or more destination application servers 17 connected to one application server gateway 16, the service provider network interfaces to the application interconnect end-point 14 in the network operator's domain via the application server gateway 16 and over a second pre-established MSRP pipe 21. FIG. 1 one illustrates two alternative configurations in the service provider network, the first configuration is a distributed model and consists of one application server gateway 16 connected to many destination application servers 17 and the second configuration is the co-located model where the application server gateway and the destination application server are collapsed into one server 18. One skilled in the art understands that in the co-located model 18, the communication between the application server gateway and the destination application server is internal and may be subject to optimizations further simplifying some of the embodiments described herein dealing with communication between the application server gateway and the destination application server.

In one embodiment, each service provider network may own one or more of the IoT devices 10. The destination application servers 17 in each service provider network can validate and keep track of the IoT device operations. However the IoT devices ownership may change over time and may be transferred to different service provider networks. In this disclosure, any changes in IoT devices ownership is transparent to the IoT devices 10, to the device gateways 11 and to the network of interconnect end-points 12 and only require updating the unique IoT device mapping for the device interconnect end-point 13 and application interconnect end-point 14, in the local authorization mapping table or the external centralized authorization table 15. In so doing, the ownership transition is rendered easier and more efficient.

The application server gateway 16 receives the VDP requests for establishing application VDPs 19 from the application interconnect end-point 14 in the network of interconnected end-points 12, over the second pre-established MSRP pipe 21 and determines whether the application VDP 19 should be accepted or denied.

Figure 2:
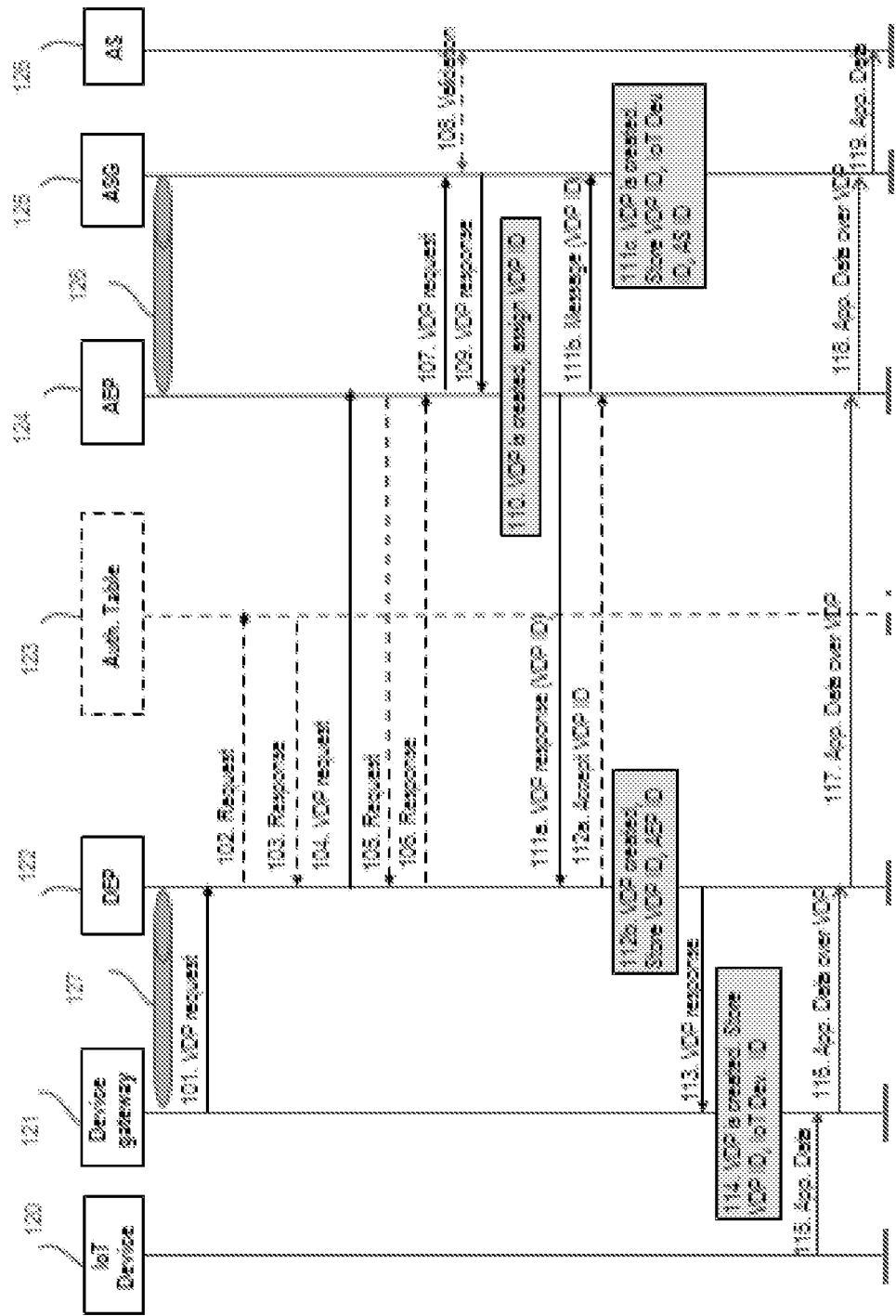
FIG. 2 illustrates a sequence diagram for establishing an application VDP, according to an embodiment.

FIG. 2 illustrates a detailed sequence diagram for establishing an application VDP for an IoT device 120 initiated by a device gateway 121, according to an embodiment. In the embodiment illustrated in FIG. 2, establishment of the application VDP is determined by the device gateway 121. The device gateway 121 maintains a list of the unique IoT device identities of the IoT devices it is connected to in the local network and determines for each IoT device if and when an application VDP should be requested. Referring to step 101, the device gateway sends for each of the IoT device requiring an application VDP, a VDP request over the first pre-established MSRP pipe 127 to a device interconnect end-point 122 in the network of interconnect end-points 12, and each VDP request comprises a unique IoT device identity and may include the identity of device gateway. Upon receiving the VDP request comprising the unique IoT device identity and optionally the device gateway identity, the device interconnect end-point 122, determines an application interconnect end-point in the network of interconnect end-points, and referring to step 105, forwards the VDP request to the application interconnect end-point 124 over the communication path between the device interconnect end-point 122 and the application interconnect end-point 124. The determination is based on checking the local authorization mapping table or alternatively, an external centralized authorization table 123. Referring to optional steps 102 and 103, when an external centralized authorization table 123 is used, the device interconnect end-point 122 sends a request comprising the unique IoT device identity to the external centralized authorization table 123 to query for the application interconnect end-point 124. The external centralized authorization table 123 checks if a mapping exists for the unique IoT device identity and sends a response comprising the application interconnect end-point 124. Alternatively, the device interconnect end-point 122 may deny the VDP request if the unique IoT device identity is not found in the local or external centralized authorization mapping table 123 or if the application interconnect end-point configured for the unique IoT device identity is out of service including a secondary (backup) application interconnect end-point. Other reasons for denying the VDP request could be used based on the network interconnect network policies.

In step 104, the device interconnect end-point 122 forwards the VDP request to the application interconnect end-point 124, the VDP request that is forwarded, comprises the unique IoT device identity and optionally the identity of the device gateway 121. The application interconnect end-point 124 determines the application server gateway 125 for the IoT device 120 and in step 107, forwards the VDP request to the application server gateway 125 over the second pre-established MSRP pipe 128 seeking authorization or acceptance for establishing the application VDP. The determination of the application server gateway 125 is based on checking the local authorization mapping table or alternatively, an external centralized authorization table 123. Referring to optional steps 105 and 106, the application interconnect end-point 124 sends a request comprising the unique IoT device identity to an external centralized authorization table 123 to query for the application server gateway 125. The external centralized authorization table 123 checks if a mapping exists for the unique IoT device identity and, if a mapping is found, it sends a response comprising the application server gateway 125. Alternatively, the application interconnect end-point 124 may deny the VDP request if the unique IoT device identity is not found in the local or external centralized authorization mapping table 123. Other reasons for denying the VDP request could be used based on the network interconnect network policies. The determination of the application server gateway 125 is based on checking the mapping in the local authorization mapping table or alternatively, query the external centralized authorization mapping table 123. One skilled in the art understands that the application interconnect end-point 124 may deny the VDP request if the unique IoT device identity is not found in the local or external centralized authorization mapping table 123.

Referring to step 107, the application interconnect end-point 124 forwards the VDP request to the application server gateway 125, the VDP request comprising the unique IoT device identity, and optionally the identity of the device gateway 121. The application server gateway 125 then determines the destination application server 126 owning the IoT device 120, and may also verify the administrative status of the IoT device 120. Referring to step 109, the application server gateway 125 sends a VDP response message to the application interconnect end-point 124, indicating if it has accepted or denied establishment of the application VDP 19 for the IoT device 120. In an exemplary embodiment, the application server gateway 125 can make the above determination by looking up a database of the IoT devices in the service provider network, where the database could indicate the destination application server 126 associated with the IoT device 120, the administrative status of the IoT device 120 (active, inactive, suspended, etc. . . . ) and/or of the device gateway 121. In another exemplary embodiment, in step 108, the application server gateway 125 sends a message to the destination application server 126 owning the IoT device so the destination application server 126 can check the administrative status (e.g., active, suspended, etc.) of the IoT device 120 and optionally of the device gateway 121 and can perhaps use other policy criteria (e.g., time of day, load, etc.) to determine if it accepts or refuses application data from the IoT device 120, at which point the application server gateway 125, in step 109, sends the response message to the application interconnect end-point 124 to either accept the VDP request for the application VDP or to reject the VDP request.

Subsequent to receiving the VDP response message, in steps 109 and 110, the application interconnect end-point 124 assigns a VDP identifier for the application VDP and stores a first association between the assigned VDP identifier and the application server gateway 125. in steps 111*a* and 111*b*, the application interconnect end-point 124 sends a VDP response message comprising the VDP identifier to the device interconnect end-point 122 and sends a message to the application server gateway 125 comprising the assigned VDP identifier and the associated unique IoT device identity. In step 112*a*, the device interconnect end-point 122 may optionally acknowledge receipt of the VDP identifier.

In step 111*c*, the application server gateway 125, when receiving the VDP identifier stores a second association comprising the unique IoT device identity, the VDP identifier and the destination application server 126. The second association could comprise the destination application server 126 if the application server gateway 125 is implemented in a distributed model such as the application server gateway 16 shown in FIG. 1.

In another exemplary embodiment, not shown in FIG. 2, the application interconnect end-point 124 allocates a VDP identifier in advance and forwards, in step 107, the VDP request comprising the VDP identifier, the unique IoT device identity and optionally the identity of the device gateway 121 to the application server gateway 125 and, if the application server gateway 125 accepts the VDP request, it stores a second association comprising the unique IoT device identity, the VDP identifier and optionally the destination application server 126. The application server gateway 125 sends a VDP response to the application interconnect endpoint 124 indicating that it accepts the request for the application VDP, at which point the application interconnect end-point 124 sends a VDP response to the device interconnect end-point 122 including the assigned VDP identifier. If the application server gateway 125 rejects the application VDP, the application interconnect end-point 124 de-allocates the VDP identifier and may send a VDP response indicating rejection, to the device interconnect end-point 122.

In steps 111*a* and 112*b*, when the device interconnect end-point 122 receives a successful VDP response comprising the assigned VDP identifier, it stores a third association comprising the VDP identifier and the application interconnect end-point 124 that has assigned the VDP identifier and in step 113, forwards the VDP response message to the device gateway 121. In step 114, when the device gateway 121 receives the VDP response message from the device interconnect end-point 122 comprising the VDP identifier assigned by the application interconnect end-point 124, the device gateway 121 stores a fourth association comprising the VDP identifier and the unique IoT device identity.

In steps 115 and 116, when the device gateway 121 receives application data, namely raw application data, from the IoT device 120 for which the application VDP is established, it checks if an association exists between the unique IoT device identity and a VDP identifier, previously referred to as a fourth association. If such association is found, the device gateway 121 adds a VDP header comprising the VDP identifier to the application data, and relays the VDP encapsulated application data on the application VDP to the device interconnect end-point 122. In one embodiment, the device gateway 121 adds an additional MSRP header further encapsulating the VDP encapsulated application data and relays the resulting MSRP encapsulated data to the device interconnect end-point 122 and over the first pre-established MSRP pipe 127.

In step 117, as the device interconnect end-point 122 receives the VDP encapsulated application data, it looks-up for the VDP identifier in the VDP header, checks for an association between the VDP identifier and the application interconnect end-point 124, also referred to above as the third association, and forwards the VDP encapsulated application data to the application interconnect end-point 124. If the VDP encapsulated application data is received over the first pre-established MSRP pipe 127, the device interconnect 122 removes the MSRP header, and forwards the VDP encapsulated application data to the application interconnect end-point 124.

In step 118, as the application interconnect end-point 124 receives the VDP encapsulated application data, it looks-up for the VDP identifier in the VDP header, checks for the association between the VDP identifier and the application server gateway 125, also referred to above as the first association, and forwards the application data on the application VDP to the application server gateway 125. If a pre-established MSRP pipe 128 is used as a communication path between the application interconnect end-point 124 and the application server gateway 125, also referred to as the second pre-established MSRP pipe 128, the application interconnect end-point adds an additional MSRP header further encapsulating the VDP encapsulated application data VDP and relays the resulting MSRP encapsulated data to the application server gateway 125.

In step 119, when the application server gateway 125 receives the VDP encapsulated application data on the application VDP it looks-up for the VDP identifier in the VDP header, checks for an association comprising the VDP identifier, the unique IoT device identifier and the destination application server 126, also referred to above as the second association. The application server gateway 125 in a distributed model may remove the VDP header and forwards the application data, namely the raw application data, to the destination application server 126 and may include the unique IoT device identity so the destination application server 126 recognizes the source of the application data. One skilled in the art understands that there can be implementation variations for indicating the source of the application data to the destination application server 126. Any implementation variations may be used as long as they indicate the source of the application data to the destination application server. Furthermore, if the application server gateway 125, in step 119, receives the VDP encapsulated application data over the second pre-established MSRP pipe 128, the application server gateway 125 removes the MSRP header before processing the VDP encapsulated application data.

In one embodiment, when the application server gateway 125 is implemented in a co-located model such as the application server gateway 18 in FIG. 1, the application server gateway 125 removes the VDP header and forwards internally the application data, namely the raw application data, to the destination application server 126.

Figure 3A:
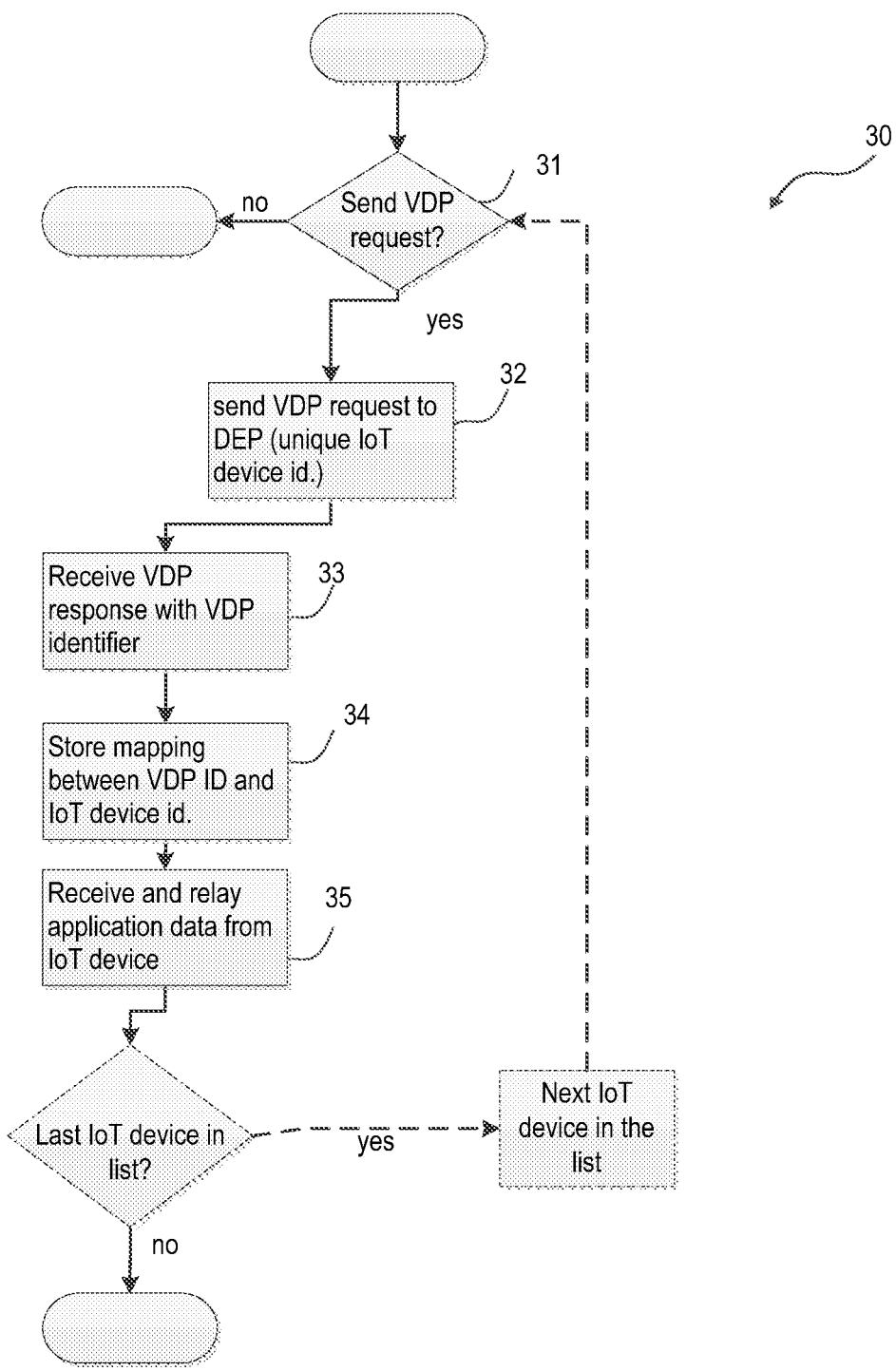
FIG. 3a illustrates a flowchart of a method executed at a device gateway, according to an embodiment.

FIG. 3*a* illustrates a flowchart of a method 30 executed at a device gateway according to one embodiment, for requesting an application VDP 19 for an IoT device and forwarding application data from the IoT device over the application VDP to the device interconnect end-point. The method in FIG. 3*a*, comprises the step 31 of determining if an application VDP should be requested for an IoT device. The device gateway can maintain a list of the unique IoT device identities for the IoT devices it is connected to in its local network, and determines for each IoT device if and when an application VDP should be requested. In step 32, the device gateway sends a VDP request to a device interconnect end-point in the network of interconnect end-points, the VDP request comprises a unique IoT device identity and may include the identity of the device gateway. Method 30 can be executed for each unique IoT device identity maintained in the list. In step 33 a VDP response is received from the device interconnect end-point, the VDP response comprising a VDP identifier in response to sending the VDP request in step 32. Alternatively, the VDP response may not include a VDP identifier, in which case it indicates failure in establishing the application VDP. Method 30 further comprises the step 34 of storing an association between the VDP identifier and the unique IoT device identifier. In step 35, the device gateway receives application data, namely raw application data from the IoT device, and relays the VDP encapsulated application data to the device interconnect end point.

Figure 3B:
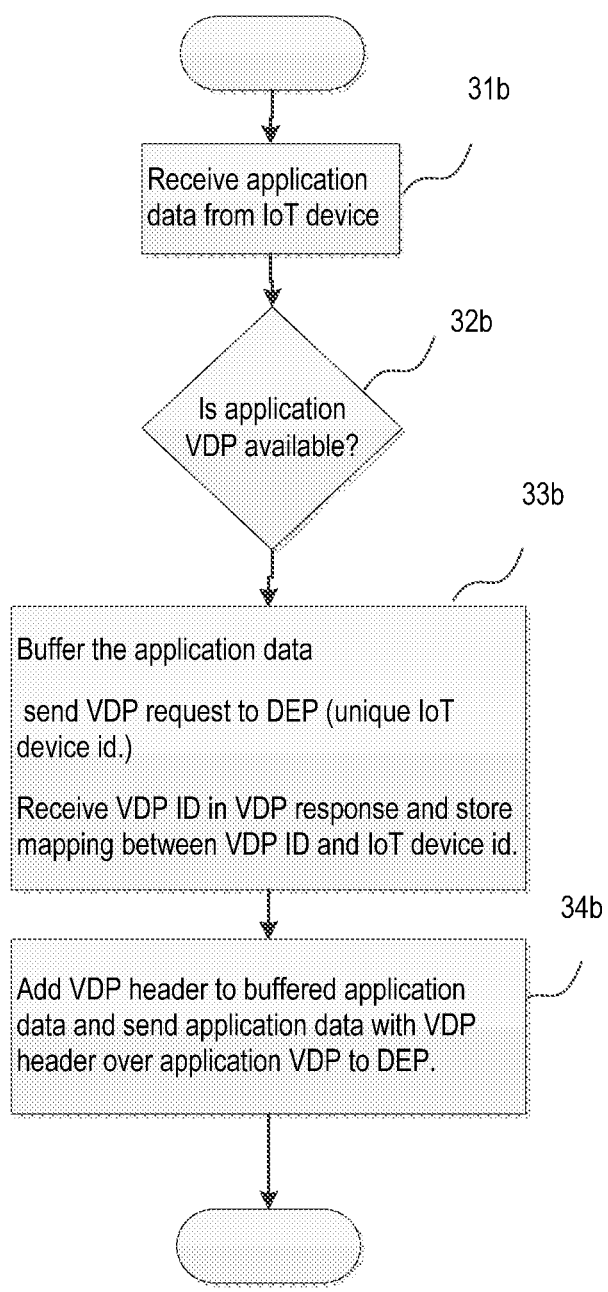
FIG. 3b illustrates a flowchart of a method executed at a device gateway, according to another exemplary embodiment.
Figure 3C:
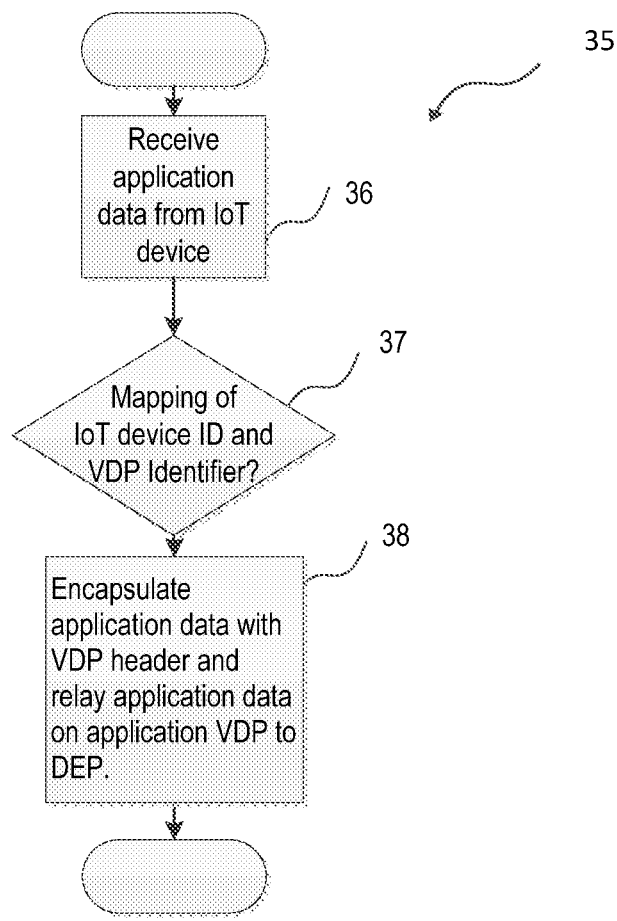
FIG. 3c illustrated a flowchart showing further detailed steps of receiving and relaying application data at a device gateway, according to an embodiment.

The step of receiving and relaying application data, step 35, is further defined in FIG. 3C and comprises receiving application data from the IoT device, step 36, looking up for an association between the unique IoT device identity of the IoT device and a VDP identifier, step 37, and if one is found, the device gateway 11 in step 38 encapsulates the application data with a VDP header comprising the VDP identifier and forwards the VDP encapsulated application data to the device interconnect end-point. The device gateway is, as previously stated, unaware of the destination application server for the application data.

In one embodiment, and with reference being now made to FIG. 3*a*, if a first pre-established MSRP pipe is used between the device gateway and the device interconnect end-point, then the step 32 of sending the VDP request also comprises encapsulating the VDP request with an MSRP header before sending the VDP request to the device interconnect end-point. Furthermore, in step 38 of FIG. 3*c*, the step of encapsulating the application data with the VDP header further comprises encapsulating the VDP encapsulated application data with an additional MSRP header and forwarding the MSRP encapsulated VDP encapsulated application data over the first pre-established MSRP pipe.

In an alternative embodiment of method 30 in FIG. 3*a*, the device gateway, in step 32, sends a VDP request to the device interconnect end-point in response to a VDP request received from an IoT device, if the IoT device has the capability of sending a VDP request to request establishment of an application VDP and the capability of terminating application VDP. The VDP request received by the IoT device comprises the unique IoT device identity. The device gateway may insert its own identity before it relays the VDP request to the device interconnect end-point. When the device gateway receives the VDP identifier from the device interconnect end-point in the VDP response message in step 33, it forwards the response to the IoT device and the application VDP is thus established between the IoT device and the application server gateway further in the network. The IoT device sends the application data to the device gateway on the application VDP, the application data is encapsulated in a VDP header comprising the VDP identifier, and the device gateway, sends the VDP encapsulated application data to the device interconnect end-point as per step 38 in FIG. 3c.

In an alternative embodiment in FIG. 3b, Method 30 further comprises the steps in the device gateway of sending a VDP request to the device interconnect end-point when receiving application data from the device IoT. In this alternative embodiment, the device gateway receives the application data from the IoT device, step 31b, and determines that no application VDP is available for the IoT device, step 32b. The determination is performed by checking in the device gateway storage whether a VDP identifier is associated to the unique IoT device identity. When an association is not found, the device gateway executes step 33b of buffering the received application data in its local memory, creating and sending the VDP request to the device interconnect end-point on behalf of the IoT device. The VDP request comprises the unique IoT device identity and an optional identity of the device gateway. Step 33b further comprises the device gateway receiving a VDP response containing a VDP identifier for the application VDP and storing an association comprising the VDP identifier and the unique IoT device identity, also referred to in this disclosure, as the fourth association. The device gateway in step 34b, retrieves the application data from the buffer, encapsulates the data in a VDP header comprising the VDP identifier and sends the VDP encapsulated application data over the application VDP to the device interconnect end-point.

It can be envisioned that the device gateway could be co-located with the IoT device, in which case the method steps as described in FIG. 3 are executed at the co-located IoT device.

Figure 4:
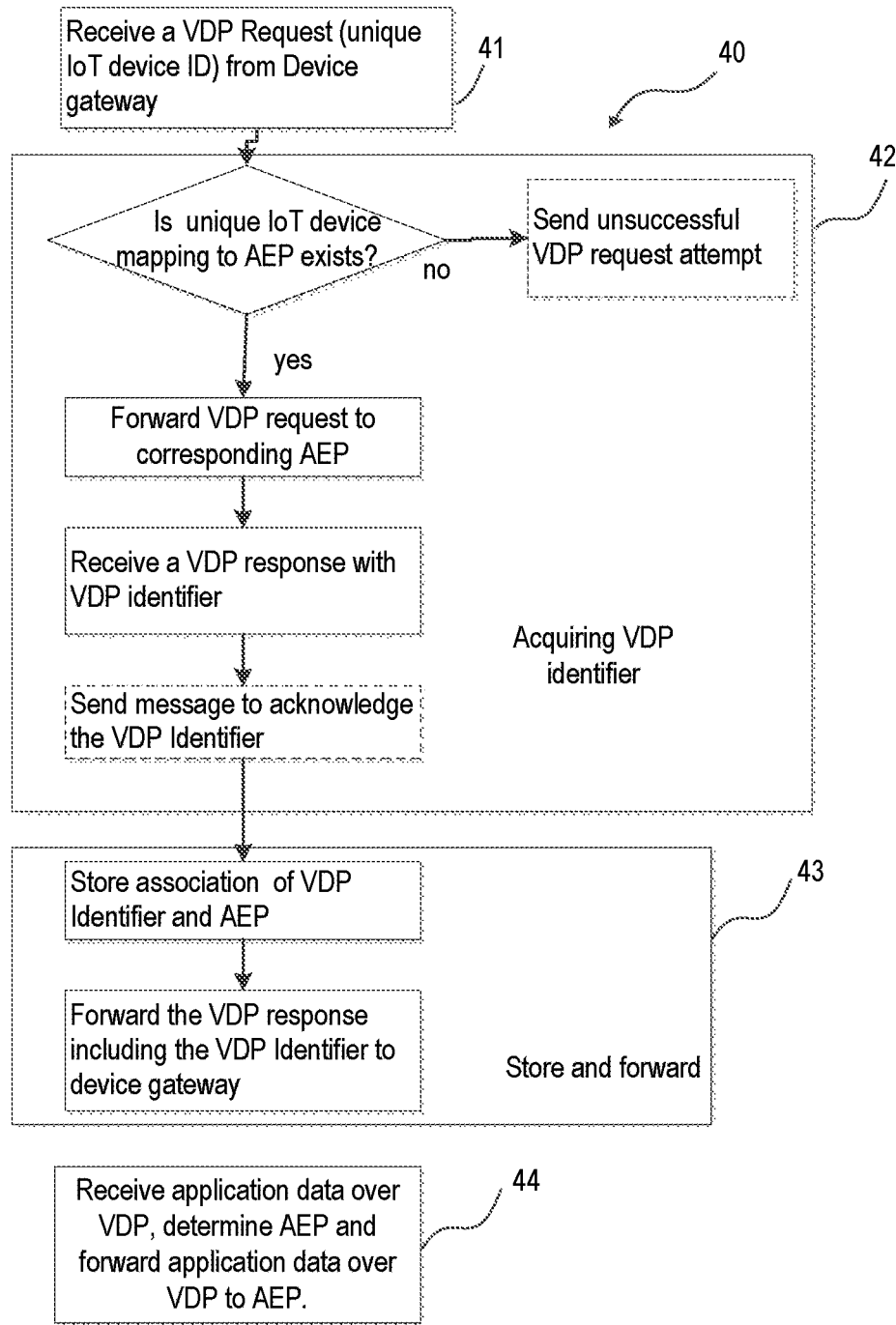
FIG. 4 illustrates a flowchart of a method executed at a device interconnect end-point, according to an embodiment.

FIG. 4 illustrates a flowchart of a method 40 executed at a device interconnect end-point, according to an exemplary embodiment. Method 40 comprises the step 41 of receiving a VDP request from the device gateway to establish an application VDP, the VDP request comprising the unique IoT device identity and optionally an identity of the device gateway. The VDP request may be received over a first pre-established MSRP pipe, in which case the device interconnect end-point removes the MSRP header to process the received VDP request. In step 42, the device interconnect end-point determines if a mapping exists associating the unique IoT device to an application interconnect end-point. The mapping may be stored in a pre-configured local authorization mapping table where the unique IoT device identity is mapped to an application interconnect end-point that is interfacing to the service provider network that owns the IoT device. Alternatively, the mapping may be stored in an external centralized authorization table. If a mapping is found, step 42 further comprises forwarding the VDP request to the application interconnect end-point, the VDP request comprising the unique IoT device identity and optionally an identity of the device gateway. In response to the VDP request, step 42 further comprises the device interconnect end-point receiving a VDP response message from the application interconnect end-point 14 comprising a VDP identifier for the application VDP. The device interconnect end-point 13 may acknowledge receipt of the VDP identifier. In step 43, the device interconnect end-point stores an association comprising the VDP identifier and the application interconnect end-point that assigned the VDP identifier, and the association is referred to, in this disclosure, as the third association. Step 43 further comprises forwarding to the device gateway a VDP response message comprising the received VDP identifier.

Subsequently, when at step 44, the device interconnect end-point receives the VDP encapsulated application data from the device gateway, it looks-up for the VDP identifier in the VDP header, checks in the storage for an association between the VDP identifier and the application interconnect end-point 14 that assigned the VDP identifier, and if one is found, the device interconnect end-point forwards the VDP encapsulated application data over the application VDP to the application interconnect end-point. The device interconnect end-point is unaware of the destination application server, the recipient of the application data originated from the IoT device. In another embodiment, if the device interconnect end-point receives the VDP encapsulated application data over a first pre-established MSRP pipe, it removes the MSRP header before processing the VDP encapsulated application data.

Figure 5A:
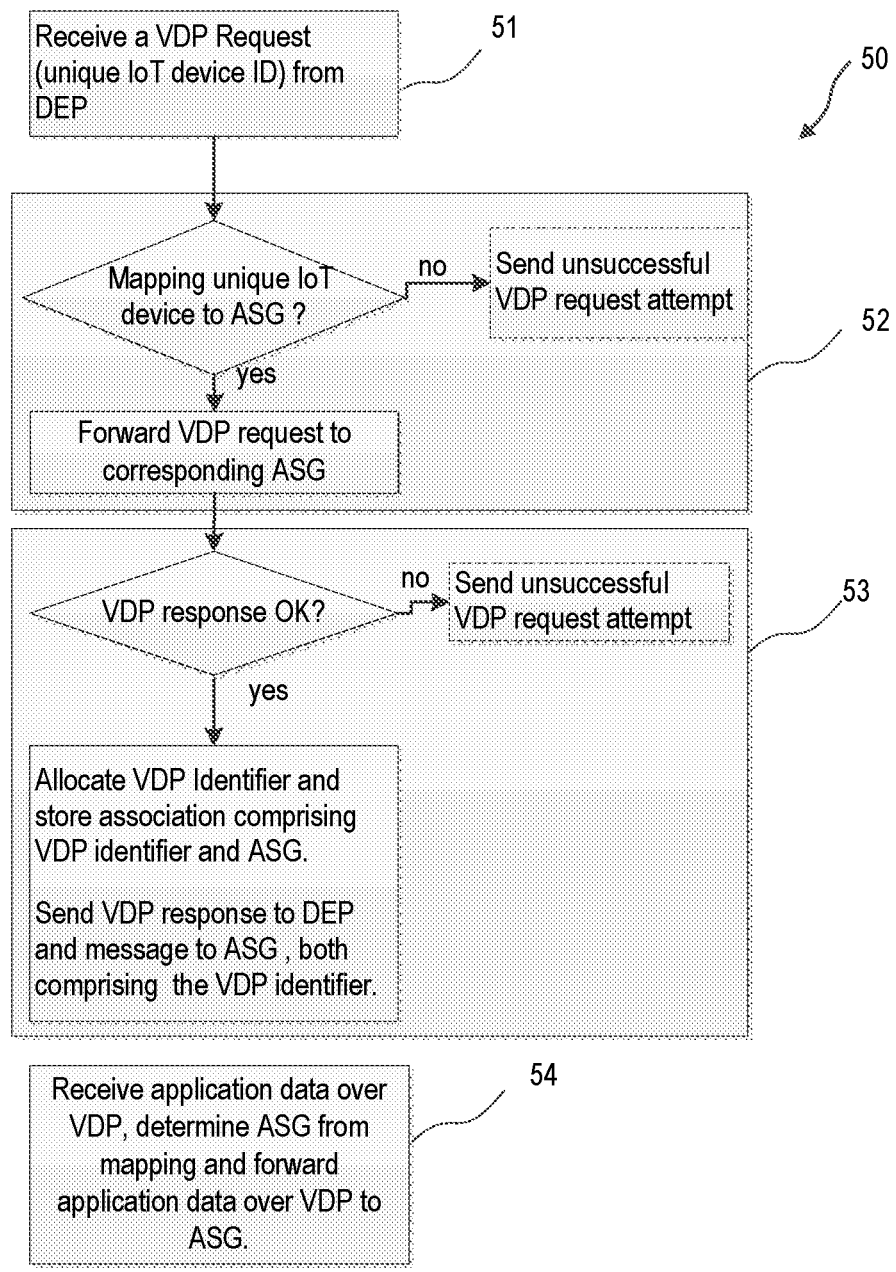
FIG. 5a illustrates a flowchart of a method executed at an application interconnect end-point, according to an embodiment.

FIG. 5a illustrates a flowchart of a method 50 executed at an application interconnect end-point, according to an exemplary embodiment. The method comprises at step 51, receiving from a device interconnect end-point a VDP request for establishing an application VDP. The VDP request comprises a unique IoT device identifier and an optional identity of the device gateway that is requesting the application VDP. Step 52, further comprises the steps of determining the application server gateway of the service provider network that owns the IoT device, in other words the application server gateway associated to the unique IoT device identity. The association is stored in a pre-configured local authorization mapping table where the unique IoT device identity is mapped to an application server gateway.

Alternatively, the association could be stored in an external centralized authorization mapping table. The external centralized authorization mapping table maintains a mapping associating the IoT devices supported by the operator's network to the respective service provider network application server gateways. The application interconnect end-point queries the external centralized authorization table for the application server gateway associated or mapped to the unique IoT device identity, and if a mapping is found, the application interconnect end-point receives, in response to the query, the application server gateway information. The application interconnect end-point forwards to the application server gateway the VDP request comprising the unique IoT device identity and optionally the identity of the device gateway. In a further embodiment, if a second pre-established MSRP pipe is used between the application interconnect end-point and the application server gateway, step 52 also comprises forwarding the VDP request encapsulated in an MSRP header. However, if a mapping has not been found, a VDP response indicating failure can be sent back to the device interconnect end-point. Method 50 further comprises step 53 of receiving a VDP response message in response to forwarding the VDP request to the application server gateway. If the VDP response message indicates acceptance of the application VDP, step 53 further comprises allocating a VDP identifier for the application VDP, and storing an association comprising the VDP identifier to the application server gateway 16. The association is referred to in this disclosure, as the third association. Step 53 further comprises sending the VDP response message comprising the VDP identifier to the device interconnect end-point. Moreover, the application interconnect end-point sends a message to the application server gateway to indicate the VDP identifier assigned for the application VDP.

Method 50 further comprises step 54 of receiving the VDP encapsulated application data on the established application VDP. In step 54, the application interconnect end-point looks-up for the VDP identifier in the VDP header, determines the application server gateway associated to the VDP identifier. The association is also referred to in this disclosure as the first association, and if an association is found, the application interconnect end-point forwards to the application server gateway the VDP encapsulated application data. Alternatively, if a second pre-established MSRP pipe is used between the application interconnect end-point and the application server gateway, the application interconnect end-point adds an additional MSRP header encapsulating the VDP encapsulated application data and relays the resulting MSRP encapsulated data to the application server gateway.

Figure 5B:
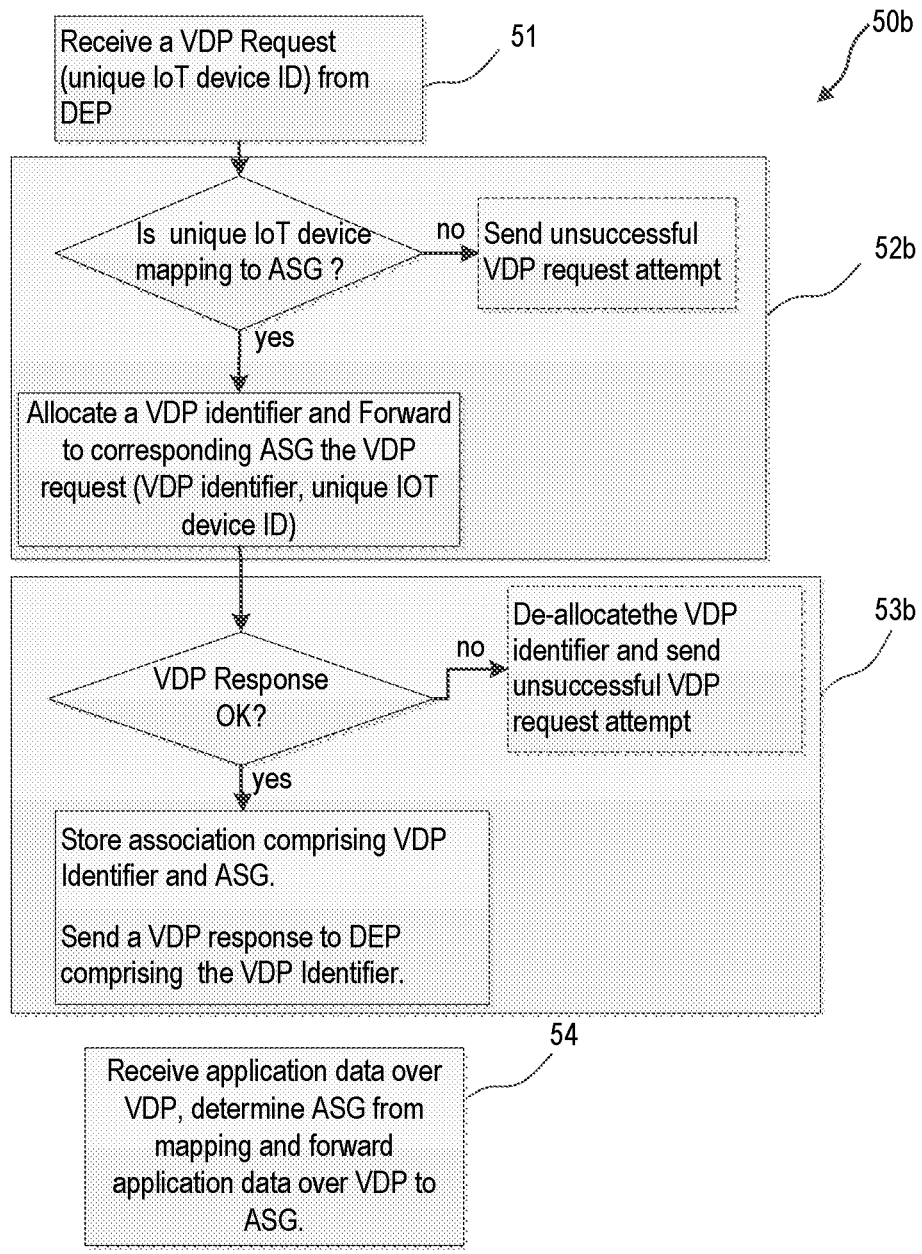
FIG. 5b illustrates a flowchart of a method executed at an application interconnect end-point, according to another exemplary embodiment.

FIG. 5b shows method 50b illustrating an alternative embodiment to method 50 of FIG. 5a. Step 51 and Step 54 of method 50b are identical to step 51 and step 54 of method 50. Step 52b of FIG. 5b is a variation of step 52 of FIG. 5a. Step 52b comprises allocating a VDP identifier prior to forwarding the VDP request message to the application server gateway. Furthermore, step 53b of FIG. 5b represents a variation of step 53 of FIG. 5a, where upon receiving a VDP response message indicating acceptance of the application VDP, the application interconnect end-point sends the VDP response message comprising the allocated VDP identifier to the device interconnect end-point, and the application interconnect end-point stores the association between the VDP identifier and the application server gateway. However, if in step 53b, the application interconnect end-point receives a VDP response message indicating failure, the application interconnect end-point de-allocates the VDP identifier and forwards the result of the VDP request to the device interconnect end-point.

Figure 6:
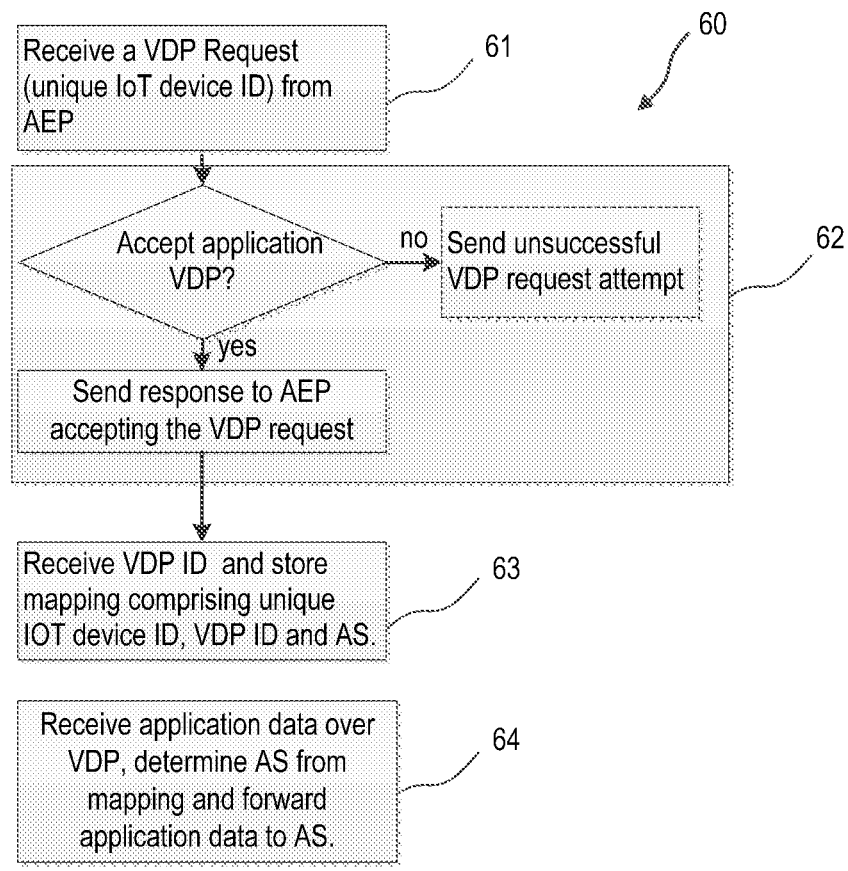
FIG. 6 illustrates a flowchart of a method executed at an application server gateway, according to an embodiment.

FIG. 6 illustrates a flowchart of a method 60 executed at an application server gateway 16, according to one embodiment. Method 60 comprises the step 61 of receiving the VDP request message from the application interconnect end-point, the VDP request comprising the unique IoT device identity, and optionally the identity of the device gateway. In step 62, the application server gateway determines the destination application server owning the IoT device and may also determine the IoT device administrative status such as verifying if the IoT device is marked by the service provider as active, suspended, or other. If the determination results in allowing the application VDP to be established, the application server gateway sends a VDP response message to the application interconnect end-point indicating acceptance of the application VDP. Subsequent to step 62, the application server gateway in step 63 may receive a message from the application interconnect end-point comprising the allocated VDP identifier, at which point the application server gateway stores an association comprising the VDP identifier, the unique IoT device identity and optionally the destination application server. The association is previously referred to, in this disclosure, as the second association.

Back to step 61 of FIG. 6, an alternative embodiment is described where, step 63 of method 60 is executed partly as part of step 61 and partly as part of step 62, where the application server gateway receives the VDP request already comprising the VDP identifier as well as the unique IoT device identity and optionally the identity of the device gateway. Following a determination that the application VDP can be accepted in step 62, the application server gateway stores an association comprising the VDP identifier, the unique IoT device identity and the destination application server, previously referred to as the second association, and sends a VDP response message to the application interconnect end-point indicating acceptance of the application VDP. If the application server gateway sends a VDP response to deny the application VDP, the application interconnect end-point de-allocates the VDP identifier and forwards the VDP response to the device application end-point.

Back to step 62 of FIG. 6, an alternative embodiment can be considered although not shown in FIG. 6. In the alternative embodiment, step 62 of determining acceptance or refusal of the application VDP may comprise sending a message to the destination application server, the message includes the unique IoT device identity. The destination application server may interpret the message as a signal for incoming application data from the IoT device. The destination application server may verify the administrative status of the IoT device and may determine based on internal policies if it is ready to accept application data from the IoT device. Once the determination process is completed, the destination application message sends a message back to the application server gateway to indicate if the IoT device is valid and if it accepts incoming application data from the IoT device. If the message indicates acceptance, the application server gateway, sends the VDP response to the application interconnect end-point to also indicate acceptance of the application VDP. One skilled in the art understands that the application server gateway may deny the VDP request if the IoT device status is marked inactive or suspended or any other status leading to rejection of the VDP request, or if the destination application server is not ready to receive application data from the IoT device.

Method 60 in FIG. 6 further comprises step 64 of receiving the VDP encapsulated application data on the application VDP, looks-up for the VDP identifier in the VDP header and determines if an association exists between the VDP identifier, the unique IoT device identifier and optionally the destination application server. The association is also referred to in this disclosure as the second association. If an association is found, the application server gateway in step 64 may remove the VDP header and forwards the application data, namely the raw application data, to the destination application server. The application server gateway may include the unique IoT device identity when forwarding the application data, so the destination application server recognizes the source of the application data. One skilled in the art understands that any implementation variations may be used to indicate the source of the application data to the destination application server. In another embodiment representing a co-located model for the application server gateway and destination application server, such as the application server gateway 18 in FIG. 1, the application server gateway may send raw application data to the destination application server. In one embodiment of step 64, if the application server gateway receives the VDP encapsulated application data over a second pre-established MSRP pipe, the application server gateway removes the MSRP header before processing the VDP encapsulated application data.

Figure 7:
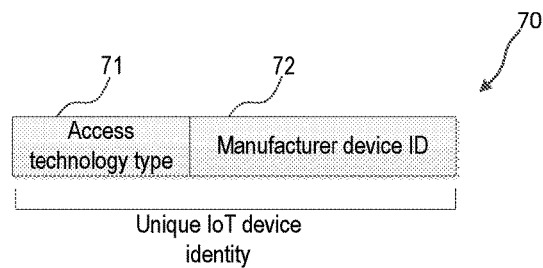
FIG. 7 illustrates a format for the unique IoT identity according to an embodiment.

FIG. 7 illustrates an embodiment for a unique IoT device identity 70 used in the establishment of the application VDP. The device gateway 11 may communicate with one or more IoT devices 10 over one or more different types of local access technology interfaces that may support different types of manufacturer device identifier types such as Media Access Control—48 bits (MAC-48), Extended Unique Identifier—48 bits (EUI-48), Extended Unique Identifier—64 bits (EUI-64) or any manufacturer serial numbers. The manufacturer device identifier 72 is considered unique at least within a local access technology type 71. The unique IoT device identity may consist of a concatenation of the access technology type 71 and the manufacturer device identifier 72 assigned to the IoT device. This would provide the uniqueness characteristic of the IoT devices across multiple local access interface types connected to a device gateway. The unique IoT device identity may be provided by the IoT device or created by the device gateway 11 or pre-configured at the device gateway 11. In yet a further embodiment, the access technology type 71 and the manufacturer device identifier 72 may be used simultaneously, and sent in separate fields in the VDP request, however the access technology type 7 should be used in conjunction with the manufacturer device identity 72 to form a unique IoT device identity.

Figure 8:
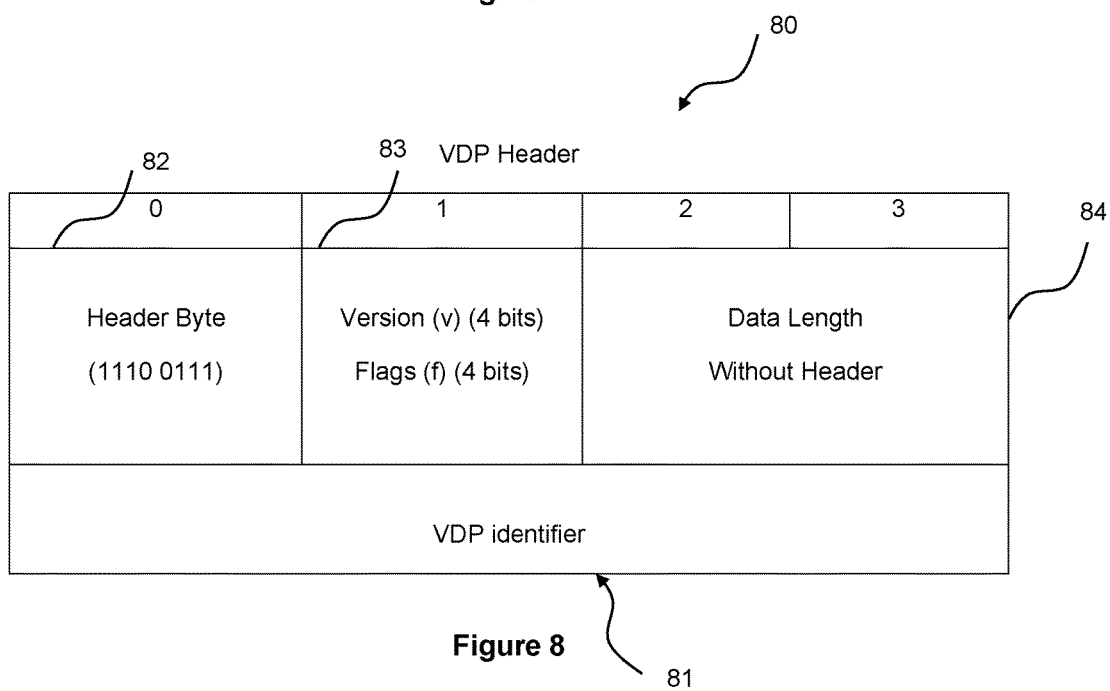
FIG. 8 illustrates a format of a VDP header, according to an embodiment.

FIG. 8 illustrates an exemplary VDP header format 80 that comprises a VDP identifier 81. The VDP header 80 may comprise other fields such as a Data Length field 84, a Header Byte 82 and a version flags 83. The data length field 84 is a 2 octet field indicating the length of the VDP identifier 81, for example the length in number of octets. The data length field 84 allows a flexible length to be used for the VDP identifier 81. The header byte 82 indicates the presence of a VDP header 80, an example of encoding the VDP header is illustrated in FIG. 8, i.e., Header byte 11100111 indicates a VDP header is present and should be parsed accordingly. The version flags 83 could be used to cater for potential future expansions of the VDP header 80 and enable forward and backward compatibility in the design.

In one embodiment illustrated in FIG. 9A, a device gateway comprises a circuitry 93a which executes the method steps according to the embodiments as described in FIG. 3a, FIG. 3b and FIG. 3c along with steps 101,113, 114, 115, 116 and 127 of FIG. 2 and other embodiments described herein. In one embodiment, the circuitry 93a may comprise a processor 90a and a storage 91a (also referred to as memory) containing instructions, which when executed, cause the processor 90a to perform the steps in a method according to embodiments described herein. The circuitry 93a may further comprise a communication interface 92a to communicate with external entities such as IoT devices and a device interconnect end-point.

In another embodiment illustrated in FIG. 9B, a device interconnect end-point comprises a circuitry 93b which executes the method steps according to the embodiments as described in FIG. 4 along with steps 101-106, 111a, 112a, 112b, 113, 116-117 and 127 of FIG. 2. In one embodiment, the circuitry 93b may comprise a processor 90b and a storage 91b (also referred to as memory) containing instructions, which when executed, cause the processor 90b to perform the steps in a method according to embodiments described herein. The circuitry 93b may further comprise a communication interface 92b to communicate with external entities which may comprise application interconnect end-points, device gateways and external centralized authorization mapping table.

In one embodiment illustrated in FIG. 9C, an application interconnect end-point comprises a circuitry 93c which executes the method steps according to the embodiments as described in FIG. 5a and FIG. 5b along with steps 104-107, 109, 110, 111a, 111b, 112a, 117, 118 and 128 of FIG. 2. In one embodiment, the circuitry 93c may comprise a processor 90c and a storage 91c (also referred to as memory) containing instructions, which when executed, cause the processor 90c to perform the steps in a method according to embodiments described herein. The circuitry 93c may further comprise a communication interface 92c to communicate with external entities which may comprise device interconnect end-points, application server gateways and external centralized authorization mapping table.

In one embodiment illustrated in FIG. 9D, an application server gateway comprises a circuitry 93d which executes the method steps according to the embodiments as described in FIG. 6 along with steps 107-109, 111b, 111c, 118, 119 and 128 of FIG. 2. In one embodiment, the circuitry 93d may comprise a processor 90d and a storage 91d (also referred to as memory) containing instructions, which when executed, cause the processor 90d to perform the steps in a method according to embodiments described herein. The circuitry 93d may further comprise a communication interface 92d to communicate with external entities which may comprise application interconnect end-points and destination application servers.

A person skilled in the art would readily understand that the network of interconnect end-points 12 of FIG. 1 comprising one or more device interconnect end-points and one or more application interconnect end-points can be implemented as a standalone server also referred to as single server interconnect, or in a cloud computing architecture.

FIG. 10 illustrates an exemplary embodiment of a device interconnect end-point comprising a processing module 1000 for using the unique IoT device identity to determine the application interconnect end-point (or the next external entity if the single node interconnect is used) when processing the VDP request. The processing module 1000 further looks-up the VDP identifier from the VDP header of the received VDP encapsulated data to determine the application interconnect end-point that has allocated the VDP identifier in order to signal the communication module 1020 to forward the VDP encapsulated data to that application interconnect end-point. Furthermore, a storage module 1010 is used for storing a mapping between the unique IoT device identity and the application interconnect end-point and also for storing an association between the VDP identifier and its assigner, i.e., the application interconnect end-point. FIG. 10 further illustrates a communication module 1020 for enabling the device interconnect end-point to communicate with the device gateway and with the application interconnect end-point. The communication module 1020 is further configured to receive from a device gateway, a VDP request for establishing the application VDP for an IoT device, and to forward the VDP request to the application interconnect end-point determined by the processing module 1000. Moreover, the communication module 1020 is further configured to receive a VDP response message comprising a VDP identifier in response to the VDP request, and to forward the VDP response comprising the VDP identifier to the device gateway. The communication module 1020 is further configured to receive the VDP encapsulated application data over the application VDP from the device gateway and to forward the VDP encapsulated application data the application interconnect end-point determined by the processing module 1000. In an embodiment, the communication module 1020 is further configured to terminate the first and the second MSRP pipes.

A person skilled in the art would understand that the modules can be implemented as a computer program miming on a processor and that the modules are operative to execute the steps of the previously described method.

The invention has been described with reference to particular embodiments. However, it will be readily apparent to those skilled in the art that it is possible to embody the invention in specific forms other than those of the embodiments described above. The described embodiments are merely illustrative and should not be considered restrictive in any way. The scope of the invention is given by the appended claims, rather than the preceding description, and all variations and equivalents that fall within the range of the claims are intended to be embraced therein.

What is claimed is:

1. A method in a device gateway of relaying application data between an Internet of Things, IoT, device and an application server in a network, the method comprising:
   sending over a pre-established communication service with the network, a request to establish an application virtual data path, VDP, with an application server gateway for transporting raw application data from the IoT device towards the application server associated with the application server gateway and wherein the request comprises a unique IoT device identity;
   receiving a response message comprising a VDP identifier for the application VDP;
   storing an association comprising the VDP identifier and the unique IoT device identity; and
   upon receiving the raw application data from the IoT device, determining the VDP identifier associated with the IoT device, encapsulating the raw application data in a VDP header comprising the VDP identifier and relaying the encapsulated raw application data over the pre-established communication service while being unaware of any destination address associated with the application server.

2. The method of claim 1, wherein sending the request to establish the application VDP is triggered by receiving a request for the application VDP from the IoT device.

3. The method of claim 1, wherein sending the request to establish the application VDP is triggered by receiving application data from the IoT device, and the method further comprises:
   determining that the application VDP for the IoT device is not yet established;
   buffering the raw application data prior to sending the request to establish the application VDP; and
   relaying the buffered raw application data encapsulated in the VDP header over the pre-established communication service.

4. The method of claim 1 and claim 3, wherein receiving the raw application data from the IoT device comprises receiving the raw application data over any access technology type.

5. The method of claim 1, wherein the unique IoT device identity comprises an access technology type and a corresponding manufacturer device identifier.

6. The method of claim 1, wherein the request further comprises an identity of the device gateway.

7. The method of claim 1, wherein the pre-established communication service is a Message Session Relay Protocol, MSRP, tunnel offering quality of service.

8. A device gateway configured to relay application data between an Internet of Things, IoT, device and an application server in a network, the device gateway comprising a circuitry configured to:
   send over a pre-established communication service with the network, a request to establish an application virtual data path, VDP, with an application server gateway to transport raw application data from the IoT device towards the application server associated with the application server gateway and wherein the request comprises a unique IoT device identity;
   receive a response message comprising a VDP identifier for the application VDP;
   store an association comprising the VDP identifier and the unique IoT device identity; and
   upon receiving the raw application data from the IoT device, determine the VDP identifier associated with the IoT device, encapsulate the raw application data in a VDP header comprising the VDP identifier and relay the encapsulated raw application data over the pre-established communication service while unaware of any destination address associated with the application server.

9. The device gateway of claim 8, wherein the circuitry comprises a processor, a communication interface and a memory, the memory containing instructions executable by the processor.

10. The device gateway of claim 8, wherein the device gateway is collocated with the IoT device.

11. A method in a network server comprising:
   receiving a request to establish an application virtual data path, VDP, between an Internet of Things, IoT, device and an application server gateway for transporting raw application data between the IoT device and a corresponding application server associated with the application server gateway and wherein the request comprises a unique IoT device identity;
   forwarding the request to a determined peer entity towards the application server gateway, and receiving a response indicating the application server gateway accepted establishment of the application VDP;
   obtaining a VDP identifier for the application VDP;
   storing a mapping comprising the VDP identifier and the determined peer entity and sending the response comprising the VDP identifier in response to the received request;
   upon receiving the raw application data encapsulated in a VDP header comprising the VDP identifier, forwarding the encapsulated raw application data to the determined peer entity while being unaware of any destination address associated with the corresponding application server.

12. The method of claim 11, wherein the determined peer entity is obtained by:
   sending a request to an external centralized authorization table, including the unique IoT device identifier, wherein the external centralized authorization table is configured to maintain a mapping between a unique IoT device identifier and a peer entity; and
   receiving a response from the external centralized authorization table comprising an identity of the peer entity associated to the unique IoT device identifier.

13. The method of claim 11, wherein the request comprises an identity of the IoT device.

14. The method of claim 11, wherein receiving the request further comprises receiving the request over a pre-established communication service consisting of a Message Session Relay Protocol, MSRP, pipe offering quality of service.

15. The method of claim 11, wherein forwarding the request further comprises forwarding the request over a pre-established communication service consisting of a Message Session Relay Protocol, MSRP, pipe offering quality of service.

16. The method of claim 11, wherein obtaining the VDP identifier further comprises receiving the VDP identifier in the response.

17. The method of claim 11, wherein obtaining the VDP identifier further comprises allocating the VDP identifier to the application VDP.

18. A network server comprising a circuitry configured to:
receive a request to establish an application virtual data path, VDP, between an Internet of Things, IoT, device and an application server gateway for transporting raw application data between the IoT device and a corresponding application server associated with the application server gateway and wherein the request comprises a unique IoT device identity;
forward the request to a determined peer entity towards the application server gateway, and receive a response indicating the application server gateway accepted establishment of the application VDP;
obtain a VDP identifier for the application VDP;
store a mapping comprising the VDP identifier and the determined peer entity and send the response comprising the VDP identifier in response to the received request; and
upon receiving the raw application data encapsulated in a VDP header comprising the VDP identifier, forward the encapsulated raw application data to the determined peer entity while unaware of any destination address associated with the corresponding application server.

19. The network server of claim 18, wherein the circuitry comprises a processor, a communication interface and a memory, the memory containing instructions executable by the processor.

20. The network server of claim 18 comprising at least two instances of network servers interconnected in a network.

21. A method in an application server gateway of connecting an Internet of Thing, IoT, device to a corresponding application server, the method comprising:
receiving a request for establishing an application virtual data path, VDP, for the IoT device, to transport raw application data between the IoT device and the corresponding application server, the request comprising a unique IoT device identity;
upon validating the unique IoT device identity in accordance with the corresponding application server, sending a response message indicating the request for establishing the application VDP is accepted;
obtaining a VDP identifier for the application VDP and storing an association between the VDP identifier, the unique IoT device identity and the corresponding application server; and
upon receiving the raw application data encapsulated in a VDP header comprising the VDP identifier, forwarding the de-capsulated raw application data to the corresponding application server in accordance with the stored association.

22. The method of claim 21, wherein the step of validating the unique IoT device identity in accordance with the corresponding application server further comprises
sending a validation request message to the corresponding application server that owns the IoT device, the message comprising the unique IoT device identity, and
receiving a response message indicating validation result.

23. The method of claim 21, wherein the step of obtaining the VDP identifier further comprises receiving another message subsequent to sending the response message, wherein the another message comprises the VDP identifier.

24. An application server gateway configured to connect an Internet of Thing, IoT, device to a corresponding application server, the application server gateway comprising a circuitry configured to:
receive a request to establish an application virtual data path, VDP, for the IoT device, to transport raw application data between the IoT device and the corresponding application server, the request comprising a unique IoT device identity;
upon validating the unique IoT device identity in accordance with the corresponding application server, send a response message to indicate the request to establish the application VDP is accepted;
obtain a VDP identifier for the application VDP and store an association between the VDP identifier, the unique IoT device identity and the corresponding application server; and
upon receiving the raw application data encapsulated in a VDP header comprising the VDP identifier, forward the de-capsulated raw application data to the corresponding application server in accordance with the stored association.

25. The application server gateway of claim 24, wherein the circuitry comprises a processor, a communication interface and a memory, the memory containing instructions executable by the processor.

26. A system comprising:
a device gateway, operationally connected to one or more Internet of Things, IoT, devices, configured to manage requests to establish an application virtual data paths, VDP, for an IoT device, the device gateway and the one or more IoT devices being unaware of any destination application server addresses;
a network server connected to the device gateway over a first pre-established communication service, configured to establish for an IoT device, the application VDP between the device gateway and an application server gateway;
the application server gateway operationally connected to the network server over a second pre-established communication service and connected to one or more destination application servers, and configured to establish the application VDP for an IoT device;
wherein:
the device gateway sends a request to establish an application VDP for an IoT device, the request comprising a unique IoT device identity;
the network server receives the request and determines a peer entity to which to forward the request based on the unique IoT device identity;
the application server gateway receives from the network server, the request to establish the application VDP for the IoT device, determines a destination application server owning the IoT device, sends a response message indicating acceptance of the application VDP, obtains a VDP identifier for the application VDP and stores an application server gateway association comprising the unique IoT device identity, the VDP identifier and the destination application server for the IoT device;

subsequent to receiving the response message, the network server obtains a VDP identifier for the application VDP, stores a network server association comprising an identity of the peer entity and the VDP identifier and forwards the response message in response to the received request;

subsequent to receiving the forwarded response message, the device gateway stores a device gateway association comprising the VDP identifier and the unique IoT device identity and upon receiving raw application data from the IoT device, encapsulates the raw application data in a VDP header comprising the VDP identifier, and relays the encapsulated raw application data over the established application VDP;

upon receiving the encapsulated raw applications data, the network server uses the network server association to forward the encapsulated raw application data to the peer entity; and upon receiving the encapsulated raw applications data, the application server gateway removes the VDP header, uses the application server gateway association to forward the raw application data to the destination application server.

27. The system of claim 26, wherein the peer entity is the application server gateway.

28. The system of claim 26, wherein the application server gateway and the destination application server are collocated.

29. The system of claim 26 further comprising an external centralized authorization entity configured to maintain a mapping of each unique IoT device identity to a peer entity, the external centralized authorization table receiving from the network server a query message comprising the unique IoT device identifier and providing the identity of peer entity.

30. The system of claim 26, wherein the first pre-established communication service and the second pre-established communication service are pre-established Message Session Relay Protocol, MSRP, pipes with quality of service characteristics.

* * * * *